April 3, 1956     W. A. ATWOOD     2,740,642
AUTOMOBILE PASSENGER CRASH PROTECTOR
Filed May 26, 1955
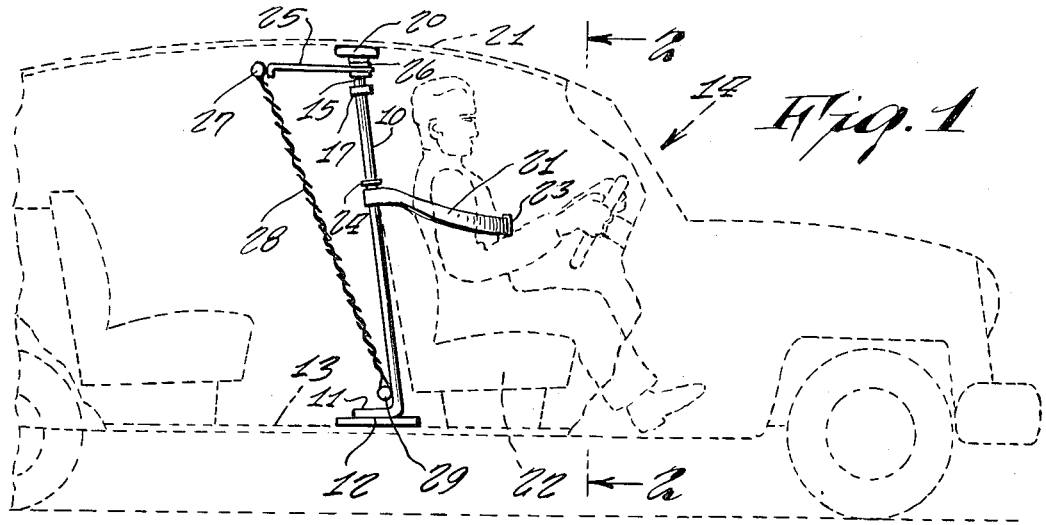
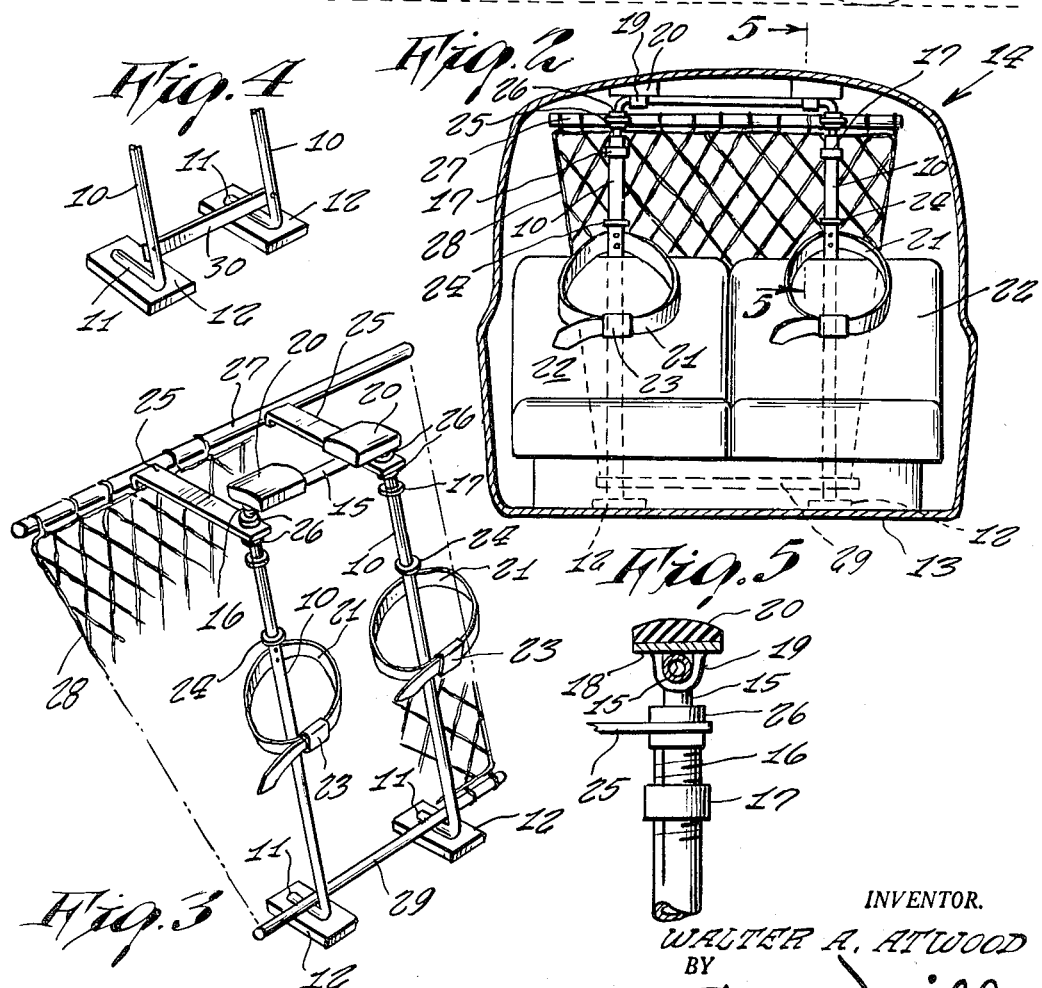
INVENTOR.
WALTER A. ATWOOD
BY Carl Miller
ATTORNEY United States Patent Office 2,740,642
Patented Apr. 3, 1956

2,740,642
AUTOMOBILE PASSENGER CRASH PROTECTOR

Walter A. Atwood, Mystic, Conn.

Application May 26, 1955, Serial No. 511,237

5 Claims. (Cl. 280—150)

This invention relates to crash protectors for automobiles.

It is an object of the present invention to provide a crash protector for automobiles which will provide comprehensive protection for passengers and which may be installed at home without special tools.

It is another object of the present invention to provide an automobile crash protector of the above type which will fit almost all types of automobiles and which requires no modification in the automobile during installation.

It is still another object of the present invention to provide a crash protector of the above type which also provides protection for the rear seat passengers without restricting the freedom of movement thereof or requiring attention and adjustment.

For other objects and a better understanding of the invention, reference may be had to the following detailed description taken in connection with the accompanying drawing, in which:

Figure 1 is a side elevational view of a preferred embodiment of the present invention shown in operative use in a vehicle;

Fig. 2 is a front elevational view thereof taken along the line 2—2 of Fig. 1;

Fig. 3 is a perspective view of the invention shown alone;

Fig. 4 is a fragmentary perspective view showing a modified form of lower cross bar; and Fig. 5 is a fragmentary vertical sectional view taken along the line 5—5 of Fig. 2.

Referring now more in detail to the drawing, 10 represents a pair of tubular uprights integrally formed at their lower ends with the rearwardly bent portions 11 suitably secured to the supporting plates 12 adapted to rest on the floor 13 of the car indicated generally at 14 (Fig. 1). It will be noted that the upper ends 10 slope slightly rearwardly and upwardly. A U-shaped tubular upper bracket 15 is provided with the externally threaded end portions 16 which are adjustable within the upper ends of the tubular uprights 10 by means of the externally knurled nuts 17.

A pair of plates 18 are mounted at the opposite ends of the bracket 15 by means of the U-shaped straps 19, the plates 18 supporting the rubber pads 20 adapted to bear on the undersurface of the car top 21 upon tightening of the nut 17 in compression relationship thereto.

The safety belts 21 are secured to the uprights 10 and are adapted to extend about the occupants of the front seat 22, being provided with friction type adjustable buckles 23 for comfort. Collars 24 adjustable on the uprights 10 prevent the belt 21 from sliding upwardly. It will be noted that pressure exerted forwardly on the uprights 10 through the belts 21 applies an upward compressor force through the pads 20 to the car top and to the supports 12 to the car floor, the pads and supports reducing the area loading to minimum values.

Rearwardly extending supports 25 are mounted on the top bracket 15 by means of the nuts 26 and serve to fixedly mount the transverse rod 27 which supports the upper end of the net 28 designed to protect the rear passengers. The lower end of the net 28 is supported by a second cross bar 29 suitably secured across the rear of the uprights 10. The rear seat protection is optional and can be installed simultaneously with the front seat assembly, installed at a later date or omitted entirely. In the latter case, the cross bar 29 of the first form of the invention will be replaced by the transverse brace 30 (Fig. 4).

It will be noted that the tubular uprights 10 provide additional support for the roof of the car in the event that the automobile turns over.

The safety belts may be positioned as follows: under the arms and across the chest, outside the arms and across the chest, or under one arm across the chest and outside the other arm at the shoulder.

While various changes may be made in the detail construction, it shall be understood that such changes shall be within the spirit and scope of the present invention as defined by the appended claims.

Having thus set forth and disclosed the nature of my invention, what is claimed is:

1. An automobile crash protector comprising a pair of laterally spaced uprights adapted to be positioned behind the front seat of the vehicle, friction means for securing the upper and lower ends of said uprights to the roof and car floor, a pair of safety belts secured to said uprights and adapted to surround the occupants of the front seat of the car, said uprights sloping slightly upwardly and rearwardly when in operative position whereby to translate any forward pressure on said uprights into an upward and downward thrust against the car floor and roof.

2. An automobile crash protector according to claim 1, said friction means comprising the lower ends of said uprights being rearwardly bent, supporting plates secured to said rearwardly bent ends positioned on the floor of the car, a U-shaped top bracket adjustable in the upper ends of said uprights, said frictional means comprising a pair of supporting plates secured to the central portion of said upper bracket and friction pads supported on said plates engaging the roof of the car.

3. An automobile crash protector according to claim 2, including rearwardly extending supports secured to the upper ends of said uprights, a first cross rod secured to the rear ends of said rearwardly extending supports, a second cross rod secured across the lower ends of said uprights above said supporting plates thereof and a net, the upper end of said net being supported on said first cross rod and the lower end of said net being supported on said second cross rod.

4. An automobile crash protector according to claim 3, said safety belts being positioned across the rear of said uprights and having friction tight safety buckles for adjusting the belts, and adjustable collars on said uprights whereby to limit the upward movement of said belts therealong.

5. An automobile crash protector according to claim 2, including a transverse brace connecting the lower ends of said uprights.

References Cited in the file of this patent

UNITED STATES PATENTS

| | | |
|---|---|---|
| 2,025,822 | Pryor | Dec. 31, 1935 |
| 2,108,303 | Beddow | Feb. 15, 1938 |
| 2,267,373 | Carlisle | Dec. 23, 1941 |
| 2,480,335 | Nordmark | Aug. 30, 1949 |